United States Patent

[11] 3,532,118

| [72] | Inventor | T. O. Paine, Deputy Administrator of the National Aeronautics and Space Administration with respect to an invention of Albert L. Young, Rolling Hills Estates, Calif. |
|---|---|---|
| [21] | Appl. No. | 730,701 |
| [22] | Filed | May 21, 1968 |
| [45] | Patented | Oct. 6, 1970 |

[54] SEMITOROIDAL DIAPHRAGM CAVITATING VALVE
10 Claims, 4 Drawing Figs.

[52] U.S. Cl................................................. 137/594,
138/46, 251/61.1, 251/127, 251/333, 251/342
[51] Int. Cl.................................................. F17d 1/04,
F16k 7/17
[50] Field of Search.......................................... 137/375,
594, 608; 251/61.1, 331, 333, 334, 341, 342, 353, 354, 121, 127; 138/37, 43, 45, 46

[56] References Cited
UNITED STATES PATENTS

| 232,380 | 9/1880 | Truesdell................. | 251/331X |
|---|---|---|---|
| 2,008,722 | 7/1935 | Mc Clintock............ | 138/43 |
| 2,159,629 | 5/1939 | Hardgrove............... | 138/46X |
| 2,684,634 | 7/1954 | Schneider................ | 138/43X |
| 2,943,643 | 7/1960 | Pinter..................... | 138/46 |
| 3,181,790 | 5/1965 | Smith...................... | 138/46X |

Primary Examiner—Henry T. Klinksiek
Attorneys—D.E. Leslie, J.H. Warden and G.T. McCoy ABSTRACT: A valve having throttling and cavitation controlled flow includes a casing containing a fixed member which supports an annular protrusion. The protrusion is at least partially surrounded by a semitoroidal metal diaphragm to define an annular valve chamber. The gap between the apex of the protrusion and the diaphragm functions as a throat and the downstream side of the chamber is shaped to cause cavitation of the fluid. The diaphragm is mounted on a set of cylinders at least one of which is flexurally supported for axial movement to vary the gap. Controlled throttling and cavitation is accomplished by selectively varying the gap. A compact biliquid configuration including actuating means is effected by mounting a set of the annular protrusions on opposite faces of the common fixed member.

INVENTOR
ALBERT L. YOUNG
BY
ATTORNEYS

INVENTOR
ALBERT L. YOUNG
ATTORNEYS

SEMITOROIDAL DIAPHRAGM CAVITATING VALVE

ORIGIN OF INVENTION

The invention described herein was made in the performance of work under a NASA contract and is subject to the provisions of section 305 of the National Aeronautics and Space Act of 1958, Public Law 85–568 (72 Stat. 435; 42 USC 2457).

BACKGROUND OF THE INVENTION

1. Field of the Invention:

The present invention relates to a flow control valve and more particularly to a valve combining throttling capability, shutoff capability, flow rate control, cavitation and mixture ratio control in a single device.

2. Description of the Prior Art:

Highly reactive, high energy rocket propellants present special problems in flow control. A satisfactory flow controller should have a high throttling capability preferably as high as 10:1 and should permit cavitation of the propellant and desirably be capable of complete shutoff. In construction; sliding or rotating parts should be avoided. Moreover, organic seals should not be used since such seals could be dissolved by the propellant. Interpropellant welds may permit leakage of propellant from one side of the weld to the other causing intervalve explosions. Many arrangements based on known concepts that are theoretically possible provide operational or manufacturing difficulties or do not provide one or more of the necessary design requirements. Current valves use nonmetallic seals, as well as rolling or sliding parts. For example, the Lemde cavitating venturi valve is bulky both in size and weight and requires the use of a complex control and actuating system. Furthermore, the Lemde valve has the added disadvantage of having rolling and sliding parts with elastomeric seals.

OBJECTS AND SUMMARY OF THE INVENTION

It is therefore an object of the invention to provide a flow controller exhibiting throttling capability, shutoff capability and cavitation controlled flow rate in a single package which does not require interpropellant welds, static or dynamic seals and sliding or rolling parts.

A further object of the invention is to provide for the control of flow of two fluids such as high energy liquid propellants using only flexural movement.

Yet another object of the invention is the provision of an all metal welded construction biliquid valve that is simple to fabricate and permits mixture ratio control of multiple liquids.

A still further object is to provide a relatively high flow rate in a very small and compact valve envelope with the use of compact and simple control and actuating means.

In the valve of the invention, a semi-toroidal diaphragm is utilized to control fluid flow as well as act as a seal and in some embodiments as a flexural support. Flow control is achieved by varying the gap between the diaphragm and an annular protrusion mounted on a fixed member in the valve housing. Cavitation is accomplished by properly shaping the downflow path of the valve chamber. Shutoff is realized by forcing the diaphragm over the annular protrusion to form a metal to metal seal. In biliquid flow control, the gaps may be set individually or cooperatively to attain and maintain a constant mixture ratio control.

The valve of the invention includes an arcuate shaped annular protruding member which is at least partially surrounded by a resilient, flexible semi-toroidal diaphragm which is adjustably mounted to vary the gap between the diaphragm and the apex of the protrusion by axial movement of the mounting member. Throttling is achieved by adjusting the throat of the valve which is formed by the gap between the apex of the protrusion and the opposite diaphragm portion. Cavitation occurs on the downstream side of the throat in the region between the arcuate protrusion and the downstream half of the diaphragm.

These and other objects and many attendant advantages of the invention will become apparent as the description of detailed embodiments proceeds in conjunction with the accompanying drawings.

DESCRIPTION OF THE PREFERRED EMBODIMENTS

Figure 1:
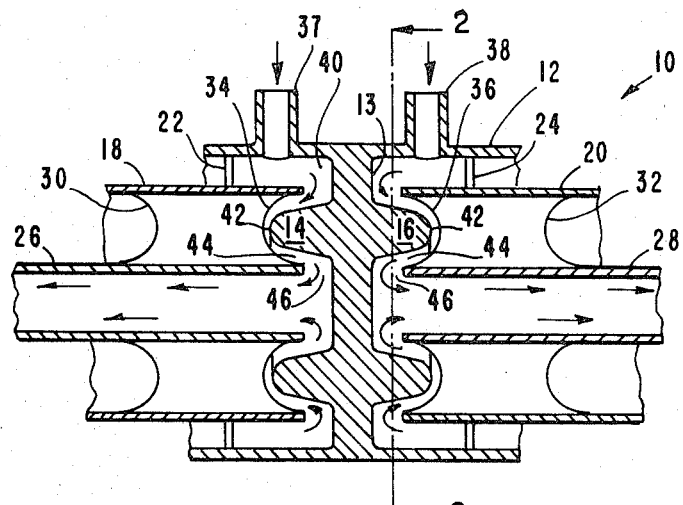
FIG. 1 is a cross-sectional view of a first embodiment of a bifluid cavitating valve according to the invention.
Figure 2:
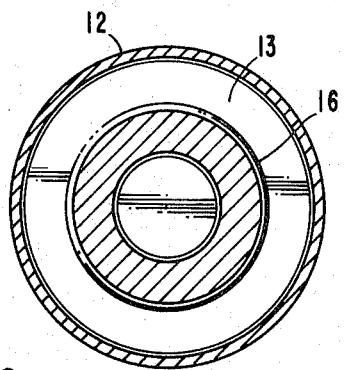
FIG. 2 is a section taken along the line 2–2 of FIG. 1.

Referring now to FIGS. 1 and 2, the biliquid valve 10 is formed of an outer cylindrical housing 12 which is bisected into two valve chambers by means of a plate 13. Arcuate annular protrusions 14 and 16 project outwardly from each surface of the plate 13. A set of outer sleeves 18 and 20 are rigidly attached to the housing 10 by means of welded ring members 22 and 24. A set of inner cylindrical sleeves 26 and 28 are flexurally supported at their outer ends by means of inwardly projecting diaphragms 30 and 32 attached to the outside surface of the inner sleeve and the inside surface of the outer sleeve. A further point of flexural attachment between each set of sleeves 26, 28, 18 and 20 is provided at the inside terminus of each sleeve by means of the semitoroidal metal valve diaphragms 34 and 36.

Fluid flow is provided to each valve chamber by means of inlet pipes 37 and 38 provided on the outside of the housing 12 between the sealing and support rings 22 and 24 and the plate 13. The fluid flow circuit proceeds from the inlet 37 or 38 in the side of the housing 12 into an annulus 40 about the periphery of each protrusion, through an orifice or throat 42 formed by the tip of the protrusion and the diaphragm, into the cavity 44 formed between the downstream side of the protrusion and the diaphragm, out the annulus 46 formed between the other edge of the protrusion and the diaphragm, and then through the inner sleeves 26 and 28. The throat on each side of the valve formed by the gap between the apex of each protrusion and the opposite diaphragm is varied by axial sliding movement of each inner sleeve 26 and 28 toward the plate 13 to decrease the gap 42 and axial sliding movement away from the plate 13 to increase the gap. Fluid flow on each side is thus regulated from full to shutoff.

Due to the large diameter of the seat, very little relative movement between the protrusion and the diaphragm and very small gaps are required for relatively large flows. The profile of the chamber defined between the protrusion and the diaphragm simulates that of a cavitating venturi. The fluid flows from a converging annulus, through a restricted orifice into a diverging annulus. The diameter of the base of the protrusion is less than the diameter of the diaphragm and the sides slope and meet to form a rounded apex. With cavitation controlled flow rate, upstream pressure is rendered relatively insensitive to downstream pressure conditions.

The dissimilar liquids flow on opposite sides of plate 13 and at no time do they flow past opposing sides of welds in the semi-toroidal diaphragm valve of the invention. This makes the valve of the invention ideally suited for use with corrosive and highly reactive liquids. The valve is of all metal construction including no dynamic and static seals and can be simply fabricated at relatively low cost. This can be compared to the complexity and cost of metallic bellows and the weight savings and space savings that are affected due to the inherent pancake configuration of the valve of the invention which permits the use of extremely short valve envelopes particularly in dual valve applications. The embodiment described above has illustrated the use of the semi-toroidal diaphragm as a flexural support and uniquely as a valve seat in conjunction with a sleeve means for actuating one edge of the diaphragm. Another embodiment will now be described in which the diaphragm is also simultaneously utilized as a static or dynamic seal and each sleeve is mounted for axial sliding movement to control the gap between the protrusion and the diaphragm.

Figure 3:
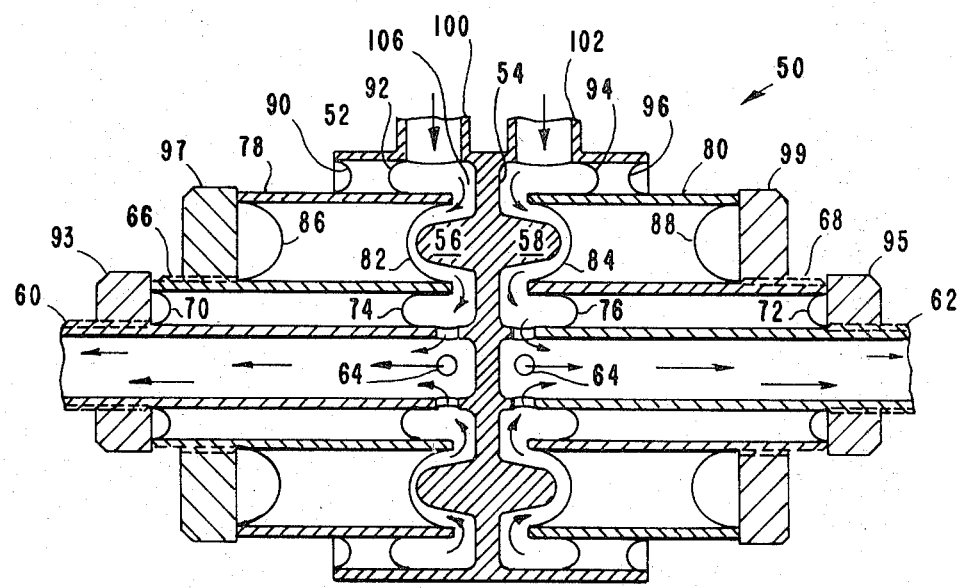
FIG. 3 is a cross sectional view of another embodiment of a biliquid cavitating valve.

Referring now to FIG. 3, the biliquid valve 50 which includes a valve body or casing formed by an outer cylindrical member 52 to which is attached an inner plate member 54 which divides the valve into right hand and left hand valve compartments. An annular outwardly projecting arcuate protrusion 56 and a similar protrusion 58 are attached to each side of the plate 54. Outlet pipes 60 and 62 are axially attached to the inner plate member 54 along the axial center line of each annular protrusion 56 and 58. The outlet pipes 60 and 62 are provided with a series of perforations 64 adjacent the plate 54. A set of inner sleeves 66 and 68 which have a diameter greater than the outlet pipes 60 and 62, but less than the inner diameter of the protrusions 56 and 58 are axially and flexurally supported with respect to the outlet pipes 60 and 62 by means of a set of four semi-toroidal diaphragms 70, 72, 74 and 76. The outer set of diaphragms 70 and 72 are mounted to face inwardly toward the plate 54 by being welded to the outer surface of the outlet pipes 60 and 62 and to the inner surface of the inner sleeves 66 and 68. The inner diaphragms 74 and 76 are similarly welded to the outlet pipes and inner sleeve and are disposed downstream from the bores 64 in the outlet pipes 60 and 62. The diaphragms are all of the same diameter.

A set of outer sleeves 78 and 80 having a diameter greater than the outer diameter of the protrusions 56 and 58, but less than that of the valve casing 52, are flexurally supported for axial movement with respect to the inner sleeves 66 and 68 and the outer casing 52. An inner semi-toroidal metallic diaphragm 82 and 84 partially surrounds each protrusion 56 and 58 and is attached to the outer surface of the inner sleeves 66 and 68 and the inner surface of the outer sleeves 78 and 80. Another set of flexible diaphragms 86 and 88 affect flexural axial attachment of the inner and outer sleeves by welding the diaphragm 86 and 88 to the sleeves at a point further removed from the protrusions 56 and 58. The outer surface of each outer sleeve 78 and 80 is flexurally attached to the inner surface of the valve casing 52 by means of two sets of cooperating metal diaphragms 90, 92, 94 and 96 which are welded to the sleeves and to the casing. The inner diaphragms 92 and 94 are disposed a distance away from the plate 54 to provide for liquid inlet 100 and 102.

The outer end of each outlet pipe 60 and 62 is threaded to receive a nut 93 and 95 which bears against each inner sleeve 66 and 68. On rotation of the nut 93 and 95, the inner sleeve is axially displaced to vary the gap between the apex of the protrusion 56 and 58 and the diaphragm 82 and 84 and to modify the downstream profile of the valve chamber. The outer end of each inner sleeve 66 and 68 is similarly threaded and a nut 97 and 99 is received thereon for selective rotation to vary each gap by axial movement of outer sleeves 78 or 80.

Liquid enters through the inlets 100 and 102 and flows into the first annulus 106 formed between the outer valve cylinder 52, the outer sleeves 78 and 80 and the inner diaphragms 82 and 84. The liquid then flows around the periphery of the protrusions 56 and 58 into the orifice formed between the protrusion and the diaphragm and around the protrusion to the exit annulus formed between the downstream edge of the protrusion and the diaphragm. The liquid is throttled and cavitates against the diaphragm on the downward side thereof and a turbulent condition is created and vaporization results. The vapor reliquifies as it leaves the orifice formed between the edge of the protrusion and the diaphragm.

In this embodiment the utilization of semi-toroidal diaphragms as flexural axial supports and seals is demonstrated by the attachment of the inner sleeve to the fluid outlet pipe and the mounting of the outer sleeve with respect to the valve body. The diaphragms have high radial stiffness and maintain the separation between the cylinders while allowing axial relative movement to flex the valve diaphragm and thus vary the gap. The semi-toroidal diaphragm which surrounds the annular protrusion also serves as a valve seat and as one profile of the cavitation chamber of the valve. Flow control of each side of the biliquid valve is again affected by varying the gap between the diaphragm and the valve protrusion. In this configuration of the valve, the control or actuation is affected by moving either the outer cylindrical sleeve or the inner sleeve which are both flexurally mounted for axial sliding movement relative to the apex of the annular protrusion by means of semi-toroidal diaphragm.

The gaps on each side of the valve may be set individually or in such a way as to maintain a constant mixture ratio control. By simultaneously moving the inner and outer sleeves, the diaphragm can be moved relative to the protrusion with less strain on the welds of the flow controlling valve seat diaphragm which during operation is being subjected to the greatest forces. Movement of the inner sleeve in addition can provide selected variation of the shape and volume of the cavitation region of the valve chamber.

Figure 4:
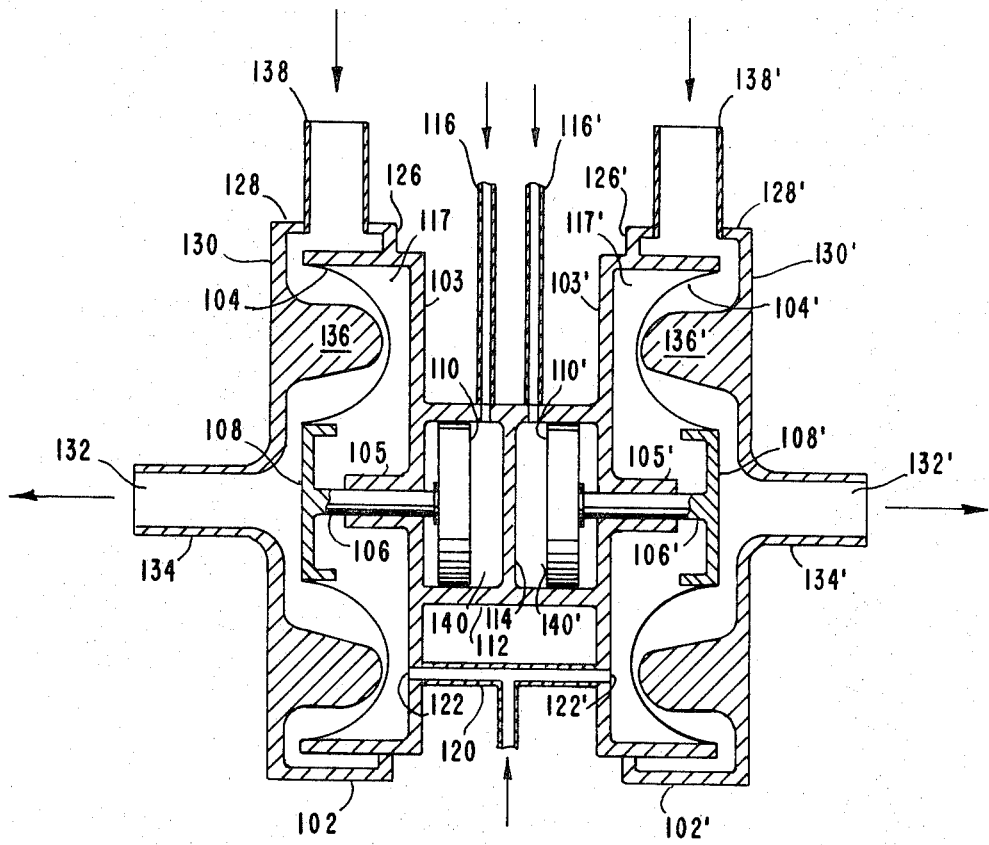
FIG. 4 is a cross sectional view of a pressure balanced, pressure actuated valve according to the invention.

The adjustment means may take other forms such as the pressure actuating means displayed in FIG. 4. In this embodiment, a pneumatic fluid stream from the propellant or the oxidant pressure controller communicates with a piston chamber which houses a piston for driving the diaphragm support means to vary the throat of the valve and to seat the valve. Also illustrated is the use of pressure on the back side of the toroidal diaphragm to balance the forces applying on the valve side of the member.

Referring now to FIG. 4, the semi-toroidal diaphragm valve includes two identical liquid circuits in the biliquid configuration shown. Each side of the valve includes a cylinder 102 and 102' which is open at its outer extremity to receive one edge of a semi-toroidal diaphragm 104 and 104'. Each cylinder 102 and 102' is closed at the other end with a back plate 103 and 103'. Each plate 103 and 103' is axially bored and a drive rod cylindrical guide member 105 and 105' projects outwardly from each bore. A drive rod 106 and 106' is slidingly received in each guide member 105 and 105' and is connected to its outer end to a cylindrical shaped head 108 and 108'. The inner end of each diaphragm 104 and 104' is attached to the side of the head. The other end of the drive arm 106 and 106' is attached to a piston 110 and 110' which is received within piston compartments formed by a cylinder 112 attached to each of the back plates 103 and 103'. The cylinder is divided into two compartments by means of a central dividing plate 114. A liquid control conduit 116 and 116' communicates with each piston compartment.

An annular diaphragm pressure balancing compartment 117 and 117' is bounded by the inner walls of cylinder 102 and 102', the wall of back plate 103 and 103', the drive arm 106 and 106' drive arm guide member 105 and 105' cylinder head 108 and 108' and the diaphragm 104 and 104' itself. A pressure manifold 120 communicates simultaneously with both of these compartments through ports 122 and 122' provided in the backplates 103 and 103'. A flange 126 and 126' extends vertically outwardly from each cylinder 102 and 102'. A concentric cylinder 128 and 128' is attached to each flange 126 and 126' to form the housing for the valve chamber. An outer plate 130 and 130' having a central axial passage 132 and 132' communicating with an outlet pipe 134 and 134' is attached to each cylinder 128 and 128'. The inside surface of the plate 130 and 130' supports an annular arcuate shaped projection 136 and 136' which is disposed to centrally project toward the semi-toroidal diaphragm 104 and 104' to form a throttling and cavitating flow passage cavity. An inlet pipe 138 and 138' is connected to each outer cylinder 128 and 128'.

In the operation of this valve pressure balancing gas is first fed to manifold 120 to apply pressure to the back face of each diaphragm 104 and 104'. Piston chambers 140 and 140' are connected to the respective pneumatic outputs of the fuel and oxidant controller to preset the gap of the annular diaphragm 104 and 104' with respect to the arcuate projections 136 and 136'. Pressure in the piston chambers 140 and 140' is transmitted to the face of the piston 110 and 110'. When the force is greater than the resilient force of the diaphragm and the pressure exerted on the valve side of the diaphragm, the piston head will move within the chamber and correspondingly, the drive rod and cylindrical diaphragm support head will move the inner edge of the diaphragms to narrow each diaphragm-protrusion gap. When the back pressure decreases, the piston will be urged in the rearward direction by the resiliency of the diaphragm and the pressure of the fluid in the valve chamber. Liquid enters the valve through the respective inlet pipes 138 and 138′, flows around the outer leading edge of the diaphragm into the gap. The setting of the gap controls the flow rate and throttling cavitation occurs on the downstream side of the diaphragm.

The valve of the invention was constructed and operated. The nominal design rating of the valve was 5GPM of water at 500 p.s.i. at a maximum gap opening of 0.0125 inches. Flow rate data was obtained for gap openings from maximum down to 0.001 inches, while the pressure was varied from 0 to 500 p.s.i. The pressure was applied from a series of pressurized nitrogen tanks and the flow rate was measured by means of an electronic counter. The gap was changed by means of a differential lead screw to actuate the cylinder on which the diaphragm was mounted.

Both throttling capability and cavitation were demonstrated. Results were repeatable to within the accuracy of the test set up and measuring system. It was found that very high flow rates could be obtained for small gap settings between the diaphragm and the protrusion. Very slight changes in the gap result in large changes in flow rate. The test results indicated capability for cavitation for values of downstream pressures of up to 75 percent upstream pressures.

The diaphragm utilized in the testing module was formed from stainless steel and at certain flow rates with certain fluids, some minor pitting is encountered. In these cases, pitting can be avoided by the use of a more errosion resistant metal. Diaphragms formed by hydroforming are generally of wide tolerance and may cause a loose fit with the mating valve parts. If an overhang or exposed flange is present, when pressure is applied, the flange deflects increasing the gap between the protrusion and the diaphragm. More precise fabrication such as by machining eliminates the flanges altogether. Exposed flange conditions are also reduced by tangentially welding the edge of the diaphragm to the diaphragm supporting structure. Pressure balancing of the diaphragm is another way to reduce distortion by deflection near the mounting of the diaphragm and also reduces the required operating force. Full seating would be facilitated by lining the seat of the diaphragm with a softer seating metal or a non-metallic resilient seating material.

The performance of the semi-toroidal metallic diaphragm valves demonstrated fully the feasibility in the areas of cavitation and throttling flow control. It is apparent that relatively high flow rates can be achieved in a very small and compact envelope. The all metallic construction without the use of interchannel welds renders the valve very suitable as a bi-propellant valve for liquid rockets and in fact in any application in which two liquids are to be separated and then mixed or applications demanding extreme cleanliness such as in food processing.

The valve design of the invention also lends itself to use in fluidic control systems as the diaphragms present a natural barrier between the operating fluids. The absence of such a barrier has been a problem in some control concepts since the addition of separators requires excess weight and usually performs no other useful function. With a fluidic control system incorporating the valve of the invention. the system could initiate flow, and then time and perform the required throttling and shutoff operations.

It is apparent that only preferred embodiments of the invention have been disclosed and that numerous substitutions, alterations and modifications are all permissible without departing from the scope of the invention as defined in the following claims.

I claim:
1. A device for controlling fluid flow comprising:
a casing defining an inlet and an outlet;
a mounting plate fixedly supported within said casing;
an annular shaped protruding member mounted on said plate within said casing having an annular, circular cross section in a plane parallel to said plate and having sides converging to an apex;
a semi-toroidal diaphragm member axially disposed with respect to said protruding member with the inner, concave surface thereof substantially surrounding said protruding member thereby defining an annular flow chamber having a converging annulus inlet portion, a restricted orifice defined by the gap between said apex and the opposing inner wall surface of said diaphragm and a diverging annulus outlet portion;
means communicating said inlet portion with said casing inlet to enable fluid to flow into said annular flow chamber through one end thereof;
means communicating said outlet portion with said casing inlet to enable fluid to flow out of said chamber through another end thereof, said members being disposed between said ends; and
means for varying said gap to control the flow of fluid between the ends of said chamber.

2. A device according to claim 1 in which said semi-toroidal member is a flexible metal diaphragm and each outer edge of said diaphragm is attached to a first and second coaxial cylinder.

3. A device according to claim 2 in which said first cylinder is fixed to said casing and said second cylinder is flexurally mounted for axial movement with respect to said diaphragm.

4. A device according to claim 3 including actuating means associated with said second cylinder for axially moving said second cylinder.

5. A device according to claim 4 in which the actuating means includes a hydraulic biased piston for axially moving said cylinder.

6. A device according to claim 3 in which said first cylinder is flexurally mounted by means of another semi-toroidal metal diaphragm mounted between said cylinders.

7. A device according to claim 2 in which said first and second cylinders are flexurally supported and means are provided for axially moving said cylinders.

8. A device according to claim 2 including a pair of annular protruding members mounted on opposing sides of a common mounting member, each protruding member being faced by a semi-toroidal diaphragm to define a plurality of annular flow chambers.

9. A device according to claim 1 in which the casing includes a chamber on the outer side of the semi-toroidal member for receiving a flow of balancing pressure fluid.

10. A flow control valve including:
a semi-toroidal flexible metal diaphragm;
a fixedly supported arcuate protrusion disposed within the inner, concave side of said diaphragm defining an annular flow chamber therebetween;
cylinder support means attached to each outer edge of said diaphragm;
flexural axial support means attached to at least one of said cylinders; and
means for axially actuating said flexurally supported cylinder to selectively control the gap between said diaphragm and said protrusion.